May 19, 1942.  H. R. HUGHES ET AL  2,283,502
MEANS FOR DUMPING FUEL FROM AN AIRCRAFT
Filed Oct. 26, 1938  2 Sheets-Sheet 1

INVENTORS
HOWARD R. HUGHES
STANLEY A. BELL
GLENN E. ODEKIRK
BY HARRIS, KIECH, FOSTER & HARRIS

FOR THE FIRM
ATTORNEYS.

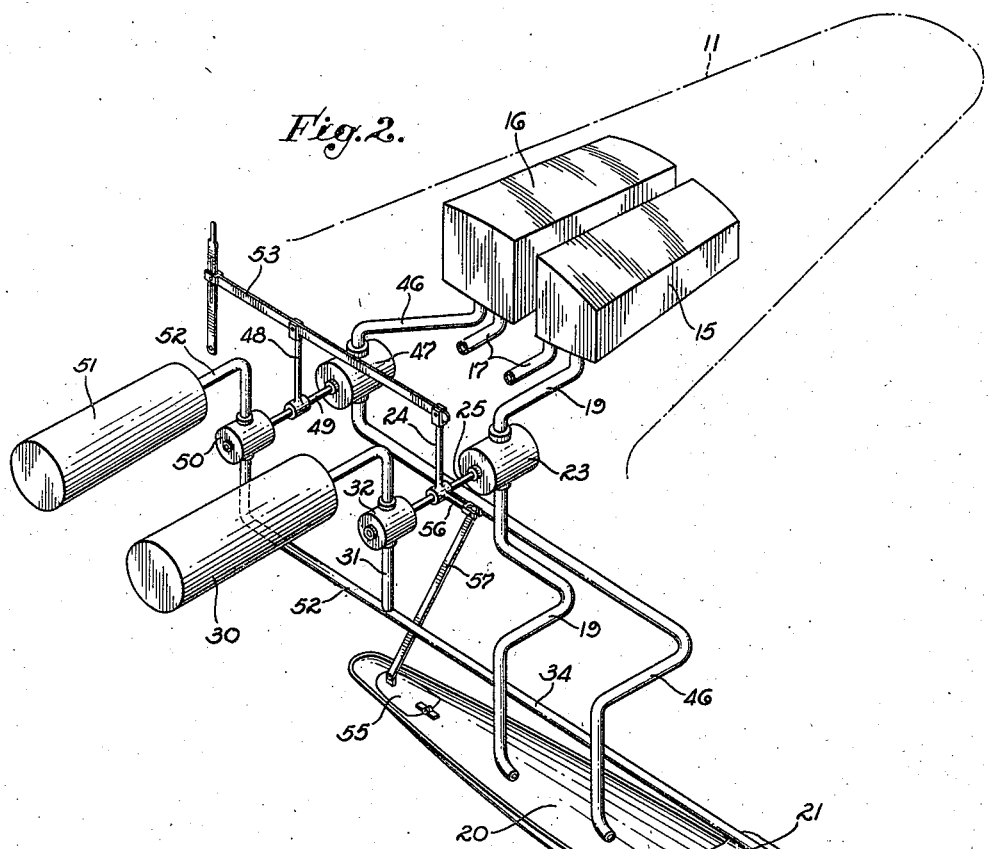
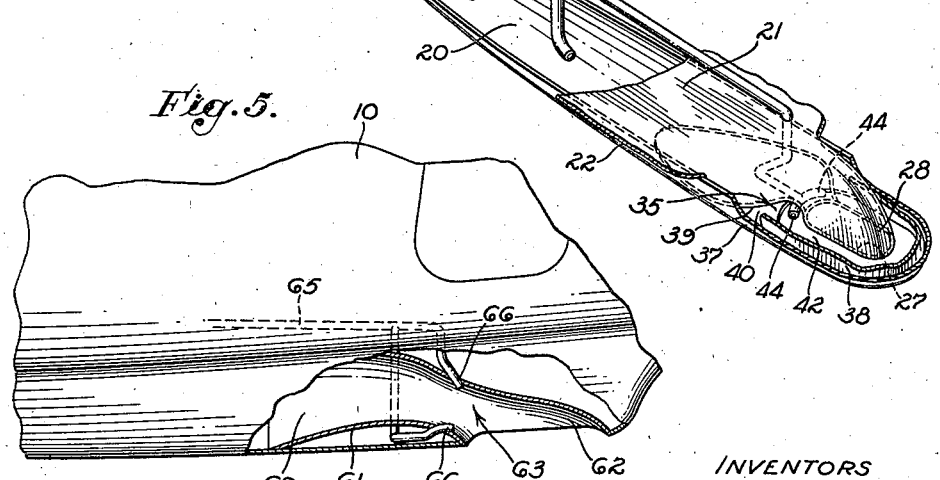

Patented May 19, 1942

2,283,502

UNITED STATES PATENT OFFICE 2,283,502

MEANS FOR DUMPING FUEL FROM AIRCRAFT

Howard R. Hughes, Houston, Tex., and Stanley A. Bell, Glendale, and Glenn E. Odekirk, Los Angeles, Calif., assignors to Hughes Tool Company, Houston, Tex., a corporation of Delaware Application October 26, 1938, Serial No. 237,038

9 Claims. (Cl. 244—135)

Our invention relates to safety devices for aircraft, and is directed specifically to a method for rapidly discharging fuel of an aircraft and to apparatus for performing the method.

In the course of operating an aircraft, emergencies arise in which it is highly advisable to quickly empty the fuel system. Dumping the fuel to lighten the aircraft makes it easier to negotiate an emergency landing, and the reduction in weight serves to minimize the strains on the ship incidental to landing. Emptying or partially reducing the fuel load also reduces the fire hazard to the ship in landing, a consideration that may be of utmost importance if it is probable that the landing will be made with considerable impact that may disrupt the fuel system.

Fuel dumping operations, as heretofore performed, have been seriously hazardous for a number of reasons. Fluid fuel discharged from an ordinary outlet and traveling rearwardly therefrom relative to the aircraft tends to hug the body or fuselage of the aircraft. If the point of discharge is near the power plant of the aircraft, and especially if it is forward of the power plant, the stream of discharged fuel or vapor therefrom may be carried or drawn into the power plant. Since the fuel supply of an aircraft is generally carried as far forward as the center of gravity, this possibility is usually present. The possibility exists even if the point of fuel discharge is well towards the rear of the aircraft body or fuselage and the engines are mounted in the wings of the aircraft at considerable lateral spacing from the aircraft body, because cross currents of air may entrain the discharged fuel. It is to be borne in mind that there is a tendency for air currents to move in helical paths around an aircraft and that turbulence in the air stream favoring cross currents is produced by engine nacelles on the wings and the propeller associated therewith.

The possibility of fuel vapors reaching the engines of an aircraft may exist even if cross currents of air exterior of the ship are not effective, because the volatile fuel stream hugging the exterior surface of the aircraft may find entry into the body of the aircraft through seams in the body wall or other apertures such as a radio antenna opening. Any fuel leaking into the aircraft tends to be circulated and to spread in vapor state throughout the interior of the aircraft to form a highly explosive mixture, even when the point of entry is well to the rear of the airplane.

The general object of our invention is to minimize the hazards mentioned above by means of various novel measures. One of these measures is to discharge the stream of fuel from the aircraft in a manner to displace the fuel stream laterally away from the aircraft body, a feature of our invention being that such lateral displacement of the fuel is accomplished without employing a discharge duct extending laterally from the body the required distance of displacement. In one form of our invention we propose to employ a deflecting wall at the end of a longitudinal dump passage to throw the fuel stream laterally the required distance of displacement. In some forms of our invention it is our purpose to employ with the fuel stream a second fluid stream to entrain or impart energy to the fuel stream. In other forms of our invention we have in mind the novel purpose of tapping the air stream flowing past the aircraft for energy to expedite the fuel dumping operation and to displace the discharge fuel stream laterally from the aircraft body.

Another object of our invention is to provide a vapor-tight discharge duct extending to a discharge point well towards the rear of the aircraft to preclude any possibility of fuel gaining entrance to the aircraft or of being entrained by exterior cross currents of air forwardly of the discharge point.

A further measure included in the objects of our invention is the provision of a stream of non-inflammable fluid discharged from the ship simultaneously with the stream of discharged fuel. Our purpose in this respect is to insulate the discharged fuel stream from the ship and to minimize the combustibility of the discharged fuel. In one form of our invention in which emphasis is placed on the formation of an intervening layer of non-inflammable fluid, it is our object to completely envelop the fuel stream in an insulating blanket of the non-inflammable fluid. In another form of our invention in which emphasis is placed on intermixing the non-inflammable fluid with the fuel, it is our object to employ the stream of non-inflammable fluid in such a manner as to increase the velocity of the fuel stream whereby the kinetic energy of the non-inflammable stream both expedites the dumping operation and assists in displacing the discharged fuel laterally from the aircraft body. For such purpose, it is our object in one embodiment of the invention to constrict the fuel discharge passage to form a throat therein and to eject the non-inflammable fluid at the throat in a manner to draw the fuel through the passage and to throw the fuel away from the discharge end of the passage.

Another object of our invention in the preferred form thereof is to provide an interlocking emergency control to govern the proportion of both the fuel discharge and the discharge of the non-inflammable fluid, the interlocking control in certain forms of our invention being extended to means for diverting a portion of the air stream from the exterior of the aircraft to assist in the dumping operation and to cleanse the channel of any residual fuel or inflammatory vapor.

The above and other objects and advantages of our invention will be apparent in the detailed description to follow, considered with the accompanying drawings. In the drawings:

Fig. 2 is a diagrammatic view in perspective of a representative form of our invention embodied in the aircraft shown in Fig. 1;

Fig. 5 is a fragmentary side elevation of an aircraft body on an enlarged scale with walls broken away to show another modification of our invention.

Figure 1:
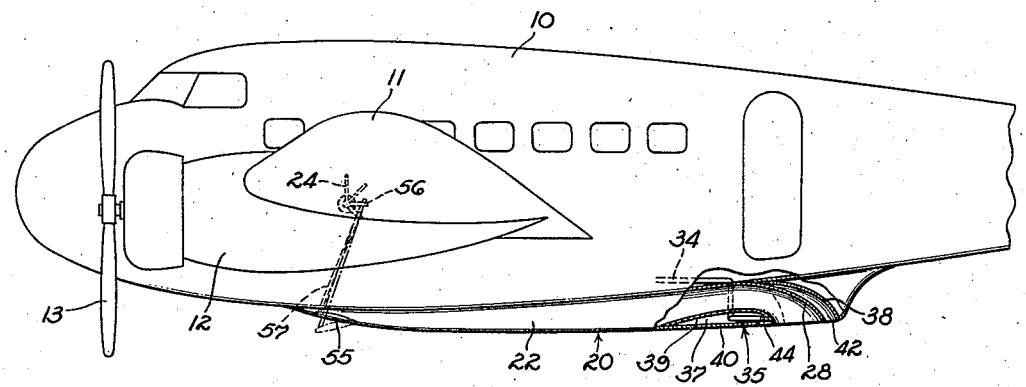
Fig. 1 is a side elevation of the major portion of a typical aircraft incorporating our invention, walls being broken away to show the fuel discharge port in section.

Fig. 1 shows a body 10 of a typical airplane, a wing 11 extending from the body, an engine nacelle 12 carried by the wing, and a propeller 13 mounted on the forward end of the nacelle. The fuel tanks for such aircraft are located in the wings or in the fuselage. For example, the means for storing fuel in an aircraft of the type illustrated generally includes pairs of tanks mounted in the framework of the airplane wings. Fig. 2 shows, by way of example, a pair of such tanks designated 15 and 16 that are mounted in one of the wings 11, the two tanks being provided with fuel line connections 17 leading to the power plants.

In accordance with the teachings of our invention, an emergency dump pipe 19 extends from the tank 15 to a dump passage 20 that extends longitudinally of the aircraft, the dump passage having an upper wall 21 and a wall 22 that serves in part as the bottom exterior wall of the aircraft. The pipe 19 and the passage 20 may be considered as one continuous dump passage, providing for emergency fuel drainage directly to the exterior of the aircraft. Fuel flow through this passage is controlled by a valve 23 in the pipe 19 that is responsive to an operating member 24 on a valve operating shaft 25, the operating member being adapted for convenient manipulation by the pilot either directly or through a suitable remote control.

The dump passage 20 is vapor-tight and may protrude from the bottom of the aircraft or may be entirely concealed within the aircraft. In either case, the dump passage terminates in a discharge port 27 located well to the rear of the aircraft, and in the preferred forms of our invention the passage has a deflecting wall 28 at the port to deflect fluid from the passage laterally from the body of the aircraft.

Fig. 2 shows a supply means in the form of a tank 30 for non-combustible fluid to be discharged simultaneously with discharge of fuel from the port 27. While any inert fluid may be employed, we prefer to use carbon dioxide. As shown in the drawings, a discharge pipe 31 from the tank 30 is controlled by a suitable valve 32. In the preferred form of our invention the valve 32 is operatively interlocked with the fuel dumping valve 23. For example, the valve 32 may be operatively connected to the valve operating shaft 25 that controls the valve 23.

Carbon dioxide flowing through the pipe 31 is carried by a pipe 34 to an expansion chamber 35 in the vicinity of the discharge port 27 of the dump passage 20. This expansion chamber may be defined in part by the inner deflecting wall 28 forming the discharge end of the dump passage 20, in part by a wall 37 that is included in the bottom wall of the aircraft, and in part by an arcuate wall 38 diverging rearwardly from the wall 28. A continuation of the expansion chamber 35 under the dump passage 20 forward of the discharge port 27 is, as shown in Fig. 1, defined in part by a lower wall 39 of the dump passage and in part by a second wall 40 spaced therebelow. The expansion chamber has its discharge opening 42 extending completely around the fuel discharge port 27 so that the release of carbon dioxide into the expansion chamber results in a blanket of fireproofing fluid to envelop the discharged stream of fuel.

The carbon dioxide may be introduced into the expansion chamber 35 in any suitable manner. For example as shown in Figs. 1 and 2, the carbon dioxide pipe 34 may branch to provide a pair of nozzles 44 within the expansion chamber. One advantage of such a nozzle arrangement is that the carbon dioxide is discharged towards the rear of the expansion chamber 35 so that a relatively heavy layer of the carbon dioxide is emitted from the rear portion of the discharge opening 42, this layer after discharge being disposed intermediate the aircraft and the stream of discharged fuel.

It is contemplated that the dump passage 20 will be centrally located to serve as a drainage channel for all of the fuel tanks on the ship. For example, the second fuel tank 16 has an emergency dump pipe 46 that also terminates in the dump passage 20, the pipe 46 being controlled by an emergency dump valve 47. The dump valve 47 is controlled by an operating member 48 on a valve operating shaft 49 and is interlocked, as previously described, with a corresponding carbon dioxide valve 50. The valve 50 controls the discharge of carbon dioxide from a supply tank 51 through a pipe 52 that connects with the previously mentioned carbon dioxide pipe 34.

As will be readily understood by those skilled in the art, all of the fuel dump valves such as the valves 23 and 47 and all of the carbon dioxide valves such as valves 32 and 50 may be operated remotely from a single control means to be opened simultaneously. Thus, each of the operating members 24 and 48 may be pivotally connected to a common remotely controlled operating rod 53.

Figure 3:
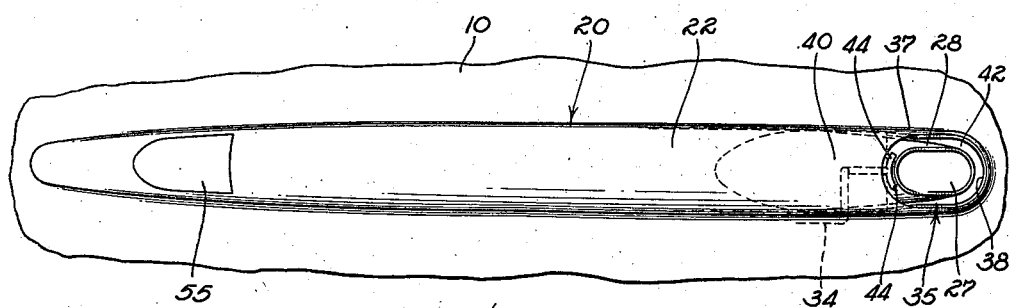
Fig. 3 is a fragmentary bottom view of the aircraft of Fig. 1 showing the fuel dumping port.

A feature of the form of our invention shown in Figs. 1, 2, and 3, is that by providing a forward opening in the dump passage 20, we may permit air streaming past the aircraft to enter the passage and to serve not only as a carrier for the discharged fuel but also as means for increasing the rate of fuel discharge, as well as means for imparting energy to the fuel stream, and means for assisting the lateral displacement of the discharged fuel from the aircraft and for cleansing the discharge channel of fuel or explosive vapors. Such a forward opening for the dump passage may be closed by a door 55, which door in the open position indicated in dotted lines in Fig. 1 serves to divert into the dump passage a portion of the air stream from beneath the aircraft body. Where such a door 55 is provided, we propose to have the door operatively interlocked with the various dump valves. For instance, in the diagrammatic arrangement shown, one of the valve operating members 24 or 48 may be operatively connected with the door 55. In the specific arrangement shown, the operating member 24 is in the form of a bell-crank providing an arm 56 for operating the door 55, the arm 56 being linked to the door by a suitable rod 57 so that whenever the dump valves are opened, the door 55 is simultaneously opened.

Figure 4:
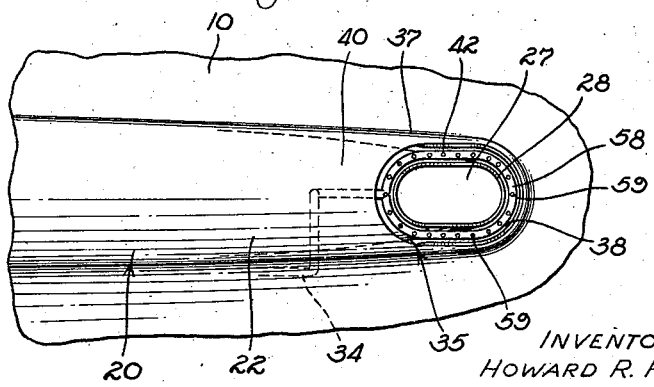
Fig. 4 is a view similar to Fig. 3 showing a modification of our invention.

The form of our invention, suggested by Fig. 4, is identical in most respects to the construction above described, corresponding numbers indicating corresponding parts. The only change involved is the substitution of a discharge manifold 58 for the pair of nozzles 44 of Figs. 1 to 3. This discharge manifold is in the form of a pipe extending substantially completely around the discharge opening 42 and may be a continuous pipe, as indicated in the drawings. The manifold has a plurality of spaced discharge ports 59 that serve to distribute the carbon dioxide in a manner to result in a blanket of carbon dioxide extending substantially uniformly around the discharged fuel stream, the carbon dioxide completely enveloping the fuel stream from all sides.

In the modification of our invention suggested by Fig. 5, it is our purpose to discharge the carbon dioxide directly into the discharging fuel stream, whereby we not only intermix the carbon dioxide with the fuel stream in an intimate manner to reduce its inflammability, but also impart energy to the fuel stream to favor the lateral displacement of the discharge fuel stream from the ship. A feature of this form of our invention is that the dump passage may be restricted to form a throat into which the carbon dioxide may be discharged for greater effectiveness both in the intermixing of the two streams and in the accelerating of the fuel discharged.

Fig. 5 shows a fuel dump passage 60 defined by a continuous wall 61, the passage terminating in a discharge port 62, and being constricted to form a throat 63 just inside the discharge port. A pipe 65 from the various carbon dioxide tanks branches to a plurality of discharge nozzles 66 that enter the dump passage 60 at the throat 63, the nozzles 66 being disposed in the general direction of the discharge port 62. The dump passage 60 may be provided with a forward port for the admission of air streaming past the ship as previously suggested.

While any non-combustible fluid, either liquid or gas, may be discharged with the fuel to reduce the fire hazard, we prefer carbon dioxide, not only because of the non-combustible character of the carbon dioxide, but also because relatively small supply tanks may be employed to provide a relatively large volume of fire-proofing gas. In this connection a feature of our invention is the conception of simultaneously expanding and discharging such a fire-proofing fluid, whereby the expanding fluid cools the discharge fuel with consequent further reduction of the likelihood of igniting the fuel.

We have described the preferred form of our invention and the modifications thereof in specific detail for the purpose of disclosure and to illustrate the principles involved. Our disclosure will suggest to those skilled in the art, however, various changes and modifications that do not depart from the essence of our conception, and we reserve the right to all such changes and modifications that properly come within the scope of our appended claims.

We claim as our invention:

1. An emergency device for emptying a fuel tank of an aircraft during flight, comprising: walls forming a dump passage from said tank to the exterior of the aircraft, said passage having a restricted throat; an emergency valve controlling fuel flow into said passage; and means to discharge a non-inflammable fluid into said passage at said throat in the general direction of the discharge end of the passage.

2. An emergency device for emptying a fuel tank of an aircraft and preventing ignition of said fuel during said emptying, said device comprising: fuel discharge means for discharging a stream of said fuel from the exterior of said aircraft; and fluid discharge means for simultaneously discharging sufficient non-inflammable fluid from said aircraft in association with said stream of fuel during substantially the entire period of fuel discharge to prevent ignition of said fuel; said fuel discharge means including walls forming a passage for said stream of fuel from said tank and having a discharge port at the exterior of said aircraft and control means for controlling the flow of fuel from said tank into said passage; said fluid discharge means including a container for non-inflammable fluid carried by said aircraft, walls forming a conduit from said container and having a discharge port communicating with said passage through the walls thereof whereby non-inflammable fluid streaming through said discharge port may impart kinetic energy to fuel flowing through said passage, and control means providing for initiating discharge of said non-inflammable fluid from said aircraft concurrently with the initial discharge of said fuel from said aircraft.

3. An emergency device for emptying a fuel tank of an aircraft and preventing ignition of said fuel during said emptying, said device comprising: walls forming a discharge passage to the exterior of the aircraft; valve means for releasing fuel from said tank to form a fuel stream in said passage; and means for discharging a stream of non-inflammable fluid into said fuel passage to intermix with said fuel stream prior to issuance of the fuel stream into the atmosphere thereby to transfer kinetic energy to the fuel stream.

4. An emergency device for emptying a fuel tank of an aircraft and preventing ignition of said fuel during said emptying, said device comprising: walls forming a discharge passage extending in a general longitudinal direction relative to the aircraft; means to release fuel from said tank into said passage, said passage having a rearward discharge port and a forward inlet port to admit a stream of air from the atmosphere to sweep through said passage thereby to entrain the released fuel and accelerate the rate of fuel flow from the tank; and means for releasing non-inflammable fluid into contact with the fuel-laden stream of air.

5. An emergency device for emptying a fuel tank of an aircraft and preventing ignition of said fuel during said emptying, said device comprising: walls forming a discharge passage; means to release fuel from said tank into said passage, said passage having a forward inlet port to admit a stream of air from the atmosphere to sweep through said passage thereby to entrain the released fuel and accelerate the rate of fuel flow from the tank, said passage having a rearward discharge port directed laterally of the aircraft to throw the fuel-laden air stream away from the aircraft; and means for releasing non-inflammable fluid into contact with said fuel-laden stream of air.

6. An emergency device for emptying a fuel tank of an aircraft and preventing ignition of said fuel during said emptying, said device comprising: walls forming a discharge passage extending in a general longitudinal direction relative to the aircraft; means to release fuel from said tank into said passage, said passage having a forward port to admit a stream of air from the atmosphere to sweep through said passage thereby to entrain the released fuel and increase the rate of fuel flow from the tank, said passage having a rearward discharge port directed laterally of the aircraft to throw said air stream away from the aircraft; and means for introducing non-inflammable fluid into said passage for intermixture with said fuel-laden stream of air.

7. An emergency device for emptying a fuel tank of an aircraft and preventing ignition of said fuel during said emptying, said device comprising: walls forming a discharge passage extending in a general longitudinal direction relative to the aircraft; means to release fuel from said tank into said passage, said passage having a rearward discharge port to the exterior of the aircraft and a forward port to admit a stream of air from the atmosphere to sweep through said passage thereby to entrain the released fuel and increase the rate of fuel flow from the tank; a closure normally closing said forward port; a source of non-inflammable fluid; and interlocking emergency means to open said closure, release fuel from said passage, and release non-inflammable fluid from said source into contact with said air stream.

8. A combination as set forth in claim 7 in which said interlocking means performs its three functions substantially concurrently and is arranged to move said closure means to an angle effective to divert air into said passage.

9. An emergency device for emptying a fuel tank of an aircraft and preventing ignition of said fuel during said emptying, said device comprising: walls forming a discharge passage extending in a general longitudinal direction relative to the aircraft; means to release fuel from said tank into said passage, said passage having a rearward discharge port to the exterior of the aircraft and a forward port to admit a stream of air from the atmosphere to sweep through said passage thereby to entrain the released fuel and increase the rate of fuel flow from the tank; a closure normally closing said forward port; a source of non-inflammable fluid adapted to discharge into said passage; valve means to release said non-inflammable fluid; means to open said closure; and means to interlock for concurrent operation said fuel releasing means, said valve means for the non-inflammable fluid, and said closure-operating means.

HOWARD R. HUGHES.
     STANLEY A. BELL.
     GLENN E. ODEKIRK.